United States Patent
Shen et al.

(10) Patent No.: US 7,599,918 B2
(45) Date of Patent: Oct. 6, 2009

(54) DYNAMIC SEARCH WITH IMPLICIT USER INTENTION MINING

(75) Inventors: Guo Bin Shen, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 11/275,400

(22) Filed: Dec. 29, 2005

(65) Prior Publication Data

US 2007/0156647 A1    Jul. 5, 2007

(51) Int. Cl.
*G06F 17/30* (2006.01)
(52) U.S. Cl. .................. 707/3; 707/6; 707/101
(58) Field of Classification Search .......... 707/1–10, 707/100, 104.1, 101, 200
See application file for complete search history.

(56) References Cited

U.S. PATENT DOCUMENTS

| | | | |
|---|---|---|---|
| 5,333,091 A | 7/1994 | Iggulden et al. |
| 5,442,633 A | 8/1995 | Perkins et al. |
| 5,497,430 A | 3/1996 | Sadovnik et al. |
| 5,530,963 A | 6/1996 | Moore et al. |
| 5,625,877 A | 4/1997 | Dunn et al. |
| 5,642,294 A | 6/1997 | Taniguchi et al. |
| 5,659,685 A | 8/1997 | Williams et al. |
| 5,710,560 A | 1/1998 | Cohn |
| 5,745,190 A | 4/1998 | Ioka |
| 5,751,378 A | 5/1998 | Chen et al. |
| 5,774,593 A | 6/1998 | Zick et al. |
| 5,778,137 A | 7/1998 | Nielsen et al. |
| 5,801,765 A | 9/1998 | Gotoh et al. |
| 5,821,945 A | 10/1998 | Yeo et al. |
| 5,835,163 A | 11/1998 | Liou et al. |
| 5,884,056 A | 3/1999 | Steele |
| 5,900,919 A | 5/1999 | Chen et al. |
| 5,901,245 A | 5/1999 | Warnick et al. |
| 5,911,008 A | 6/1999 | Niikura et al. |
| 5,920,360 A | 7/1999 | Coleman, Jr. |
| 5,952,993 A | 9/1999 | Matsuda et al. |
| 5,956,026 A | 9/1999 | Ratakonda |
| 5,959,697 A | 9/1999 | Coleman, Jr. |
| 5,966,126 A | 10/1999 | Szabo |
| 5,983,273 A | 11/1999 | White et al. |

(Continued)

FOREIGN PATENT DOCUMENTS

EP    0597450    5/1994

(Continued)

OTHER PUBLICATIONS

Goncalves, "Towards a Learning Model for Feature Integration in Attention Control", retrieved on Jul. 19, 2006 at <<http://ieeexplore.ieee.org/search/srchabstract.jsp?arnumber=1013553&isnumber=21824&pun>>, International Conference on Multisensor Fusion and Integration for Intelligent Systems, Aug. 20-22, 2001, pp. 311-316.

(Continued)

*Primary Examiner*—Mohammad Ali
*Assistant Examiner*—Marc R Filipczyk
(74) *Attorney, Agent, or Firm*—Lee & Hayes, PLLC (57) ABSTRACT

After a user instigated search returns results, an intention mining engine collects information from the natural user responses to the results. This information is used to refine the search.

15 Claims, 7 Drawing Sheets

U.S. PATENT DOCUMENTS

| | | | |
|---|---|---|---|
| 5,990,980 | A | 11/1999 | Golin |
| 5,995,095 | A | 11/1999 | Ratakonda |
| 6,020,901 | A | 2/2000 | Lavelle et al. |
| 604,708 | A | 4/2000 | Sato et al. |
| 6,047,085 | A | 4/2000 | Sato et al. |
| 610,094 | A | 8/2000 | Dimitrova et al. |
| 6,100,941 | A | 8/2000 | Dimitrova et al. |
| 6,166,735 | A | 12/2000 | Dom et al. |
| 6,168,273 | B1 | 1/2001 | Dupraz et al. |
| 6,182,133 | B1* | 1/2001 | Horvitz ............... 709/223 |
| 6,232,974 | B1 | 5/2001 | Horvitz et al. |
| 6,236,395 | B1 | 5/2001 | Sezan et al. |
| 6,282,317 | B1 | 8/2001 | Luo et al. |
| 6,292,589 | B1 | 9/2001 | Chow et al. |
| 6,298,145 | B1 | 10/2001 | Zhang et al. |
| 6,307,550 | B1 | 10/2001 | Chen et al. |
| 6,332,163 | B1 | 12/2001 | Bowman-Amuah |
| 6,353,824 | B1 | 3/2002 | Boguraev et al. |
| 6,389,168 | B2 | 5/2002 | Altunbasak et al. |
| 6,408,128 | B1 | 6/2002 | Abecassis |
| 6,421,675 | B1* | 7/2002 | Ryan et al. ............ 707/100 |
| 6,449,251 | B1 | 9/2002 | Awadallah et al. |
| 6,462,754 | B1 | 10/2002 | Chakraborty et al. |
| 6,466,702 | B1 | 10/2002 | Atkins et al. |
| 6,473,778 | B1 | 10/2002 | Gibbon |
| 6,516,090 | B1 | 2/2003 | Lennon et al. |
| 6,581,096 | B1 | 6/2003 | Cottrille et al. |
| 6,616,700 | B1 | 9/2003 | Thum et al. |
| 6,622,134 | B1 | 9/2003 | Sorkin |
| 6,631,403 | B1 | 10/2003 | Deutsch et al. |
| 6,643,643 | B1 | 11/2003 | Lee et al. |
| 6,643,665 | B2 | 11/2003 | Kimbell et al. |
| 6,658,059 | B1 | 12/2003 | Iu et al. |
| 6,661,468 | B2 | 12/2003 | Alten et al. |
| 6,670,963 | B2 | 12/2003 | Osberger |
| 671,490 | A1 | 3/2004 | Gibbon et al. |
| 6,711,587 | B1 | 3/2004 | Dufaux |
| 6,714,909 | B1 | 3/2004 | Gibbon et al. |
| 6,721,454 | B1 | 4/2004 | Qian et al. |
| 6,773,778 | B2 | 8/2004 | Onozawa et al. |
| 6,792,144 | B1 | 9/2004 | Yan et al. |
| 6,807,361 | B1 | 10/2004 | Girgensohn et al. |
| 6,870,956 | B2 | 3/2005 | Qi et al. |
| 6,934,415 | B2 | 8/2005 | Stentiford |
| 6,956,573 | B1 | 10/2005 | Bergen et al. |
| 7,006,091 | B2 | 2/2006 | Masera et al. |
| 7,055,166 | B1 | 5/2006 | Logan et al. |
| 7,062,705 | B1 | 6/2006 | Kirkwood et al. |
| 7,065,707 | B2 | 6/2006 | Chen et al. |
| 7,069,310 | B1 | 6/2006 | Bartholomew |
| 7,072,984 | B1 | 7/2006 | Polonsky et al. |
| 7,095,907 | B1 | 8/2006 | Berkner et al. |
| 7,116,716 | B2 | 10/2006 | Ma et al. |
| 7,248,294 | B2 | 7/2007 | Slatter |
| 7,296,168 | B2 | 11/2007 | Edwards |
| 7,325,199 | B1 | 1/2008 | Reid |
| 7,356,464 | B2 | 4/2008 | Stella et al. |
| 2001/0023450 | A1 | 9/2001 | Chu |
| 2001/0047355 | A1* | 11/2001 | Anwar ............... 707/5 |
| 2002/0067376 | A1 | 6/2002 | Martin et al. |
| 2002/0069218 | A1 | 6/2002 | Sull et al. |
| 2002/0073218 | A1 | 6/2002 | Aspromonte et al. |
| 2002/0100052 | A1 | 7/2002 | Daniels |
| 2002/0157116 | A1 | 10/2002 | Jasinschi |
| 2002/0166123 | A1 | 11/2002 | Schrader et al. |
| 2003/0033347 | A1 | 2/2003 | Bolle et al. |
| 2003/0115607 | A1 | 6/2003 | Morioka et al. |
| 2003/0123850 | A1 | 7/2003 | Jun et al. |
| 2003/0152363 | A1 | 8/2003 | Jeannin et al. |
| 2003/0210886 | A1 | 11/2003 | Li et al. |
| 2003/0237053 | A1 | 12/2003 | Chen et al. |
| 2004/0001106 | A1 | 1/2004 | Deutscher et al. |
| 2004/0040041 | A1 | 2/2004 | Crawford |
| 2004/0068481 | A1 | 4/2004 | Seshadri et al. |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |
| 2004/0085341 | A1 | 5/2004 | Hua et al. |
| 2004/0088726 | A1 | 5/2004 | Ma et al. |
| 2004/0125877 | A1 | 7/2004 | Chang et al. |
| 2004/0128317 | A1 | 7/2004 | Sull et al. |
| 2004/0165784 | A1 | 8/2004 | Xie et al. |
| 2004/0184776 | A1 | 9/2004 | Inoue et al. |
| 2005/0084232 | A1 | 4/2005 | Herberger et al. |
| 2005/0175001 | A1 | 8/2005 | Becker Hof et al. |
| 2005/0207442 | A1 | 9/2005 | Zoest et al. |
| 2005/0262439 | A1 | 11/2005 | Cameron |
| 2006/0026528 | A1 | 2/2006 | Paulsen et al. |
| 2006/0123053 | A1* | 6/2006 | Scannell, Jr. ............ 707/104.1 |
| 2006/0190435 | A1* | 8/2006 | Heidloff et al. ............ 707/3 |
| 2006/0200442 | A1* | 9/2006 | Parikh ............... 707/1 |
| 2006/0239644 | A1 | 10/2006 | Barbieri |
| 2007/0027754 | A1* | 2/2007 | Collins et al. ............ 705/14 |
| 2007/0060099 | A1* | 3/2007 | Ramer et al. ............ 455/405 |
| 2008/0065751 | A1* | 3/2008 | Hampson ............... 709/223 |

FOREIGN PATENT DOCUMENTS

| | | |
|---|---|---|
| EP | 1168840 | 1/2002 |
| EP | 1213915 | 6/2002 |
| GB | 2356080 | 5/2001 |
| JP | 2002238027 | 8/2002 |
| KR | 20020009089 A | 2/2002 |
| KR | 20040042449 A | 5/2004 |
| WO | WO0028467 A1 | 5/2000 |

OTHER PUBLICATIONS

Osberger, et al., "An Automatic Image Quality Assessment Technique Incorporating Higher Level Perceptual Factors", retrieved on Jul. 19, 2006, at<<http://ieeexplore.ieee.org/search/srchabstract.jsp?arnumber727227&.isnumber==15680&punu>>, International Conference on Image Processing, vol. 3, Oct. 4-7, 1998, pp. 414-418.

U.S. Appl. No. 10/179,161, filed Jun. 24, 2002 inventors Jin-Lin Chen & Wei-Ying Ma entitled "Function-based Object MOdel for Web Page Display in a Mobile Device".

U.S. Appl. No. 10/285,933, filed Nov. 01, 2002 inventors Yu-Fei Ma et al. entitled "Systems and Methods for Generating a Motion Attention Mode".

U.S. Appl. No. 10/286,053, filed Nov. 01, 2002 inventors Yu-Fei Ma et al. entitled "Systems and Methods for Generating a Comprehensive User Attention Model".

U.S. Appl. No. 10/286,348, filed Nov. 1, 2002 inventors Xian-Sheng Hua et al. entitled "Systems and Methods for Automatically Editing a Video".

U.S. Appl. No. 10/371,126, filed Feb. 20 2003 Inventors Wei-Ying Ma et al. Entitled "Systems and Methods for Enhanced Image Adaptation".

"Advanced Digital Video Storage and On-line Retrieval System", Advisor Project, Jun. 30, 2002, retrieved from the Internet http://advisor.matrasi-tls.fr/DUP_workshop_sheet.pdf.

Ahmad, "Visit: A Neural Model of Covert Visual Attention" Advances in Neural Information Processing Systems v. 4 1991 pp. 420-427.

Baluja et al., "Expectation-Based Selective Attention for Visual Monitoring and Control of a Robot Vehicle" Robotics and Autonomous System v. 22 No. 3-4 Dec. 1997 pp. 329-344.

Bertini et al., "Indexing for Resue of TV News Shots" Pattern Recognition, Elsevier, Kidlington, GB, vol. 35, No. 3, Mar. 2002, pp. 581-591.

Chen et al., "A Visual Attention Model for Adapting Images on Small Displays" ACM Multimedia Systems Journal 2003.

Chen et al., "Function-based Object Model Towards Website Adaptation" (2001) Proc. of the 10th Int. wWW Conf. pp. 1-21.

Cherry, "Pesky Home Networks Trouble cable Behemoths" IEEE Spectrum Apr. 2002 pp. 60-61.
Christopoulos et al., "The JPEG2000 Still Image Coding System: An Overview" IEEE Transactions on Consumer Electronics vol. 46 No. 4 pp. 1103-1127 Nov. 2000.
Deng et al., "Peer Group Filtering and Perceptual Color Image Quantization" Proceedings of IEEE International Symposium on Circuits and systems vol. 4 1999 pp. 21-24.
Divakaran et al., "Video Summarization Using Descriptors of Motion Activity: A Motion Activity based approach to Key-Frame Extraction from Video Shots" Journal of Electronic Imaging Oct. 2001 vol. 10 n 4 pp. 909-916.
Gamaz at al., "Robust scene-change detection in MPEG compressed domain" Elec & Comp. Eng. pp. 95-99 1998.
Gu et al., "Dissolve detection in MPEG compressed video" IEEE pp. 1692-1696 1997.
Hargrove et al., "Logo Detection in Digital Video" Math 100 Mar. 06, 2001 http://toonarchive.com/logo-detection/ 9 pages.
Held, "Focus on Agere System's Orinoco PC Card" International Journal of Network Management Jan. 2002 pp. 187-193.
Heng et al., "Post shot boundary detection technique: Flashlight scene determination" University of Western Australia pp. 447-450 1999.
http://www.fatalfx.com/nomad/ "NOMAD (No More Advertising)" Feb. 17, 2003 4 pages.
Itti et al., A Comparison of Feature Combination Strategies for Saliceny-Based Visual Attention Systesm: Proc. of SPIE Human Vision and Electronic Imaging IV (HVEI'99) San Jose CA vol. 3644 pp. 473-482 Jan. 1999.
Itti et al., "A Model of Saliency-based Visual Attention for Rapid Scene Analysis" IEEE Trans. on Pattern Analysis and Machine Intelligence 1998 5 pages.
Itti et al., "Computational Modelling of Visual Attention" Nature Reviews/Neuroscience vol. 2 Mar. 2001 pp. 1-11.
Jha et al., "Wireless Landscape-Need for Seamless Connectivity" Wireless Personal Communications 2002 pp. 275-283.
Jing et al., "An Effective Region-Based Image Retrieval Framework" From ACM Multimedia 2002 28 pages.
Lee at al., "Automatic Video Parsing Using Shot Boundary Detection and Camera Operation Analysis" Pattern Recognition, Elsevier, Kidlington, GB, vol. 34, No. 3, Mar. 2001, pp. 711-719.
Lee et al., "Perception-Based Image Transcoding for Universal Multimedia Access" School of Electrical Engineering Korea University Seoul Korea 2001 IEEE pp. 475-478.
Lelescu et al., "Real-time scene change detection on compressed multimedia bitstream based on statistical sequential analysis" IEEE pp. 1141-1144 2000.
Li et al., "Statistical Learning of Multi-View Face Detection" Proceedings of ECCV 2002 25 pages.
Lienhart, et al., "On the Detection and Recognition of Television Commercials" University of Mannheim 17 pages.
Lin et al., "Video Scene Extraction by Force Competition" IEEE Intl. Conference on Multimedia and Expo (ICME 001) Waseda University Tokyo Japan Aug. 22-25, 2001 4 pages.
Lu et al., "A Robust Audio Classification and Segmentation Method" Microsoft Research China 9 pages.
Lu at al., "Content Analysis for Audio Classification and Segmentation" IEEE Transactions on Speech and Audion Processing vol. 10 No. 7 Oct. 2002 pp. 504-516.
Lu et al., "Content-Based Audio Segmentation Using Support Vector Machines" 2001 IEEE pp. 956-959.
Ma et al., "A Model of Motion Attention for Video Skimming" Microsoft Research Asia 4 pages.
Ma et al., "A New Perceived Motion Based Shot Content Representation" Microsoft Research China 4 pages.
Ma et al., "A User Attention Model for Video Summarization" Proceedings of ICIP 2002.
Milanese et al., "Attentive Mechanisms for Dynamic and Static Scene Analysis" Optical Engineering v34 No. 8 Aug. 1995 pp. 2428-2434.
Niebur et al., "Computational Architectures for Attention" The Attentive Brain Chapter 9 1998 pp. 163-186.
"An MPEG-1 shot boundary detector using XIL colour histograms" Dublin City University pp. 1-7 1998.

O'Toole et al., "Evaluation of Automatic Shot Boundary Detection on a Large Video Test Suite" School of Computer Applications & School of Electronic Engineering Dublin City University Glasnevin Dublin Ireland Challenge of Image Retrieval Newcastle 1999 pp. 1-12.
Sahoo et al., "Threshold Selection Using a Minimal Histogram Entropy Difference" Optical Engineering v36 No. 7 Jul. 1997 pp. 1976-1981.
Sanchez et al., "AudiCom: a Video Analysis System for Auditing Commercial Broadcasts" Computer Vision Center Departament d'Informatica Universitat Autonoma de Barcelona 5 pages.
Smith et al., "Video Skimming and Characterization through the Combination of Image and Language Understanding Techniques" Proc. of Computer Vision and Pattern Recognition 1997 IEEE pp. 775-781.
Tsotsos et al., "Modeling Visual Attention Via Selective Tuning" Artificial Intelligence v78 1995 pp. 507-545.
Wolfe et al., "Deplying Visual Attention: The Guided Search Model" AI and the Eye Chapter 4 1990 pp. 79-103.
Yeo et al., "Rapid scene analysis on compressed video" IEEE pp. 533544 1995.
Yusoff et al., "Video shot cut detection using adaptive thresholding" University of Surrey pp. 1-10 2000.
Yusoff, et al., "Video shot cut detection using adaptive thresholding" University of Surrey pp. 1-10 2000.
Zadeh, "Probability Measures of Fuzzy Events" Journal of Mathematical Analysis and Applications 23 1968 pp. 421-427.
Zhang at al., "A Hierarchical Organization Scheme for Video Data" Pattern Recognition, Elsevier, Kidlington, GB, vol. 35 No. 11, Nov. 2002, pp. 2381-2387.
Adams, et al., "Seeded Region Growing", IEEE, vol. 16, No. 6, 1994, pp. 641-648.
Alexander, et al., "Informedia: News-on-Demand Multimedia Information Acquisition and Retrieval", 1997, pp. 1-21.
DeMenthon, et al., "Video Summarization by Curve Simplification", ACM, 1998, pp. 211-218.
Gong, et al., "Creating Motion Video Summaries with Partial Audio-Visual Alignment", IEEE, 2002, pp. 285-288.
Bennett, et al., "Proscenium: A Framework for Spatio-Temporal Video Editing", MM'03, Nov. 2-3, 2003, Berkeley, California, 8 pages.
Fan, et al., "Visual Attention Based Image Browsing on Mobile Devices", 4 pages.
Foote, et al., "Creating Music Videos using Automatic Media Analysis", 8 pages.
Girgensogn, et al., "A Semi-automatic Approach to Home Video Editing", UIST 2000, San Diego, CA, 9 pages.
Girgensogn, et al., "Home Video Editing Made Easy—Balancing Automation and User Control", 8 pages.
Graham, et al., "The Video Paper Multimedia Playback System", Nov. 2-8, 2003, 2 pages.
Hua, et al., "Automatically Convering Photographic Series into Video", MM '04, Oct. 10-16, 2004, New York, NY, 8 pages.
Hua, et al., "AVE—Automated Home Video Editing", 2003, ACM, 8 pages.
Yip, et al., "The Automatic Video Editor", Nov. 2-8, 2003, Berkeley, California, 2 pages.
Dufaux, "Key frame selection to represent a video", Proc. 2000 Int. Con. on Image Processing, vol. 2, Sep. 2000, pp. 275-278.
Rauschenbach, et al., "Demand-driven image transmission with levels of detail and regions of interest", Computers & Graphics, 1999, pp. 857-866.
Rauschenbach, et al., "Flexible Embedded Image Communication using Levels of Detail and Regions of Interest", Proc. IMC'98, 1998, pp. 1-10.
Li, "PeerStreaming A Practical P2P Streaming System", Microsoft, Sep. 2004.
Vetro, et al., "Object-Based Transcoding for Adaptable Video Content Delivery", Transactions on Circuits and Systems for Video Technology, IEEE, vol. 11, No. 3, Mar. 2001, pp. 387-401.
Wolf, "Key Frame Selection by Motion Analysis", Conf. Proceedings Acoustics, Speech, and Signal Processing, 1996 IEEE International Conference, May 1996, vol. 2, pp. 1228-1231.

Zhuang et al., "Adaptive Key Frame Extraction Using Unsupervised Clustering", Oct. 1998 in IEEE International Conference on Image Processing, vol. 1, pp. 866-870.

Beg, "User Feedback Based Enchancement in Web Search Quality", Elsevier Inc., 2004, pp. 20.

Degn, et al., "Peer Group Filtering and Perceptual Color Image Quantization", IEEE, 1999, p. 8.

Kelly, et al., "Implicit Feedback for Inferring User Preference: A Bibliography", SIGIR FORUM, vol. 37, No. 2, 2003, pp. 18-28.

"NOMAD (No More Advertising)", http://www.fatalfx.com/nornadi, Feb. 17, 2003 4 pages.

Pirolli, "Exploring Browser Design Trade-offs Using a Dynamical Model of Optimal Information Foraging", Proc. SIGHI Conference on Human factors in Computing Systems CHI, 1998, pp. 33-40.

Smith, et al., "Scalable Multimedia Delivery for Pervasive Computing", ACM, 1999, pp. 131-140.

Sugiyama, et al., "Adaptive Web Search Based on User s Implicit Preference", DEWS, 2004, p. 8.

* cited by examiner

DYNAMIC SEARCH WITH IMPLICIT USER INTENTION MINING

BACKGROUND

Web and desktop searches have proven popular yet difficult applications. To improve search accuracy, efforts have been invested in the improvement of page ranking in terms of relevance. Despite these efforts, however, a large gap still exists between the results returned by a search, and the results desired by a user.

Often, a user may have to try multiple search keywords related to a searching target, and/or multiple search iterations, to get a reasonably relevant result. This is especially the case when the user does not have an exact description of the search target, such as when the user wants to search multimedia content such as music and images, which are difficult, if not impossible, to adequately describe using written search terms.

SUMMARY

This Summary is provided to introduce a selection of concepts in a simplified form that are farther described below in the Detailed Description. This Summary is not intended to identify key features or essential features of the claimed subject matter, nor is it intended to be used as an aid in determining the scope of the claimed subject matter.

In view of the above, after a user instigated search returns results, an intention mining engine collects information from the natural user responses to the results. This information is used to refine the search.

DETAILED DESCRIPTION

Overview

The following disclosure describes systems and methods for performing a dynamic search with implicit user intention mining. In one embodiment, a search initiated by a user is refined using information regarding the user's preferences. This information is collected before a search is initiated. In another embodiment, a search initiated by a user is refined using information mined from the user's responses to results of the search. In yet another embodiment, a search initiated by a user is refined using information from the user collected before the search was initiated, as well as information mined from the user's responses to results of the search, along with other information regarding the user which is available at the time of the search.

These and other aspects of the systems and methods to perform a dynamic search with implicit user intention mining are now described in greater detail.

An Exemplary System

Although not required, the systems and methods for performing a dynamic search with implicit user intention mining are described in the general context of computer-executable instructions (program modules) being executed by a computer device such as a personal computer. Program modules generally include routines, programs, objects, components, data structures, etc., that perform particular tasks or implement particular abstract data types. While the systems and methods are described in the foregoing context, it will be understood that acts and operations described hereinafter may be implemented in any suitable hardware, software, firmware, or combination thereof. It will also be understood that the term "natural response" as used herein may include conscious selections made by the user, conscious and unconscious behavior of the user, and other information available regarding the interests, preferences, and/or behavior of the user.

Figure 1:
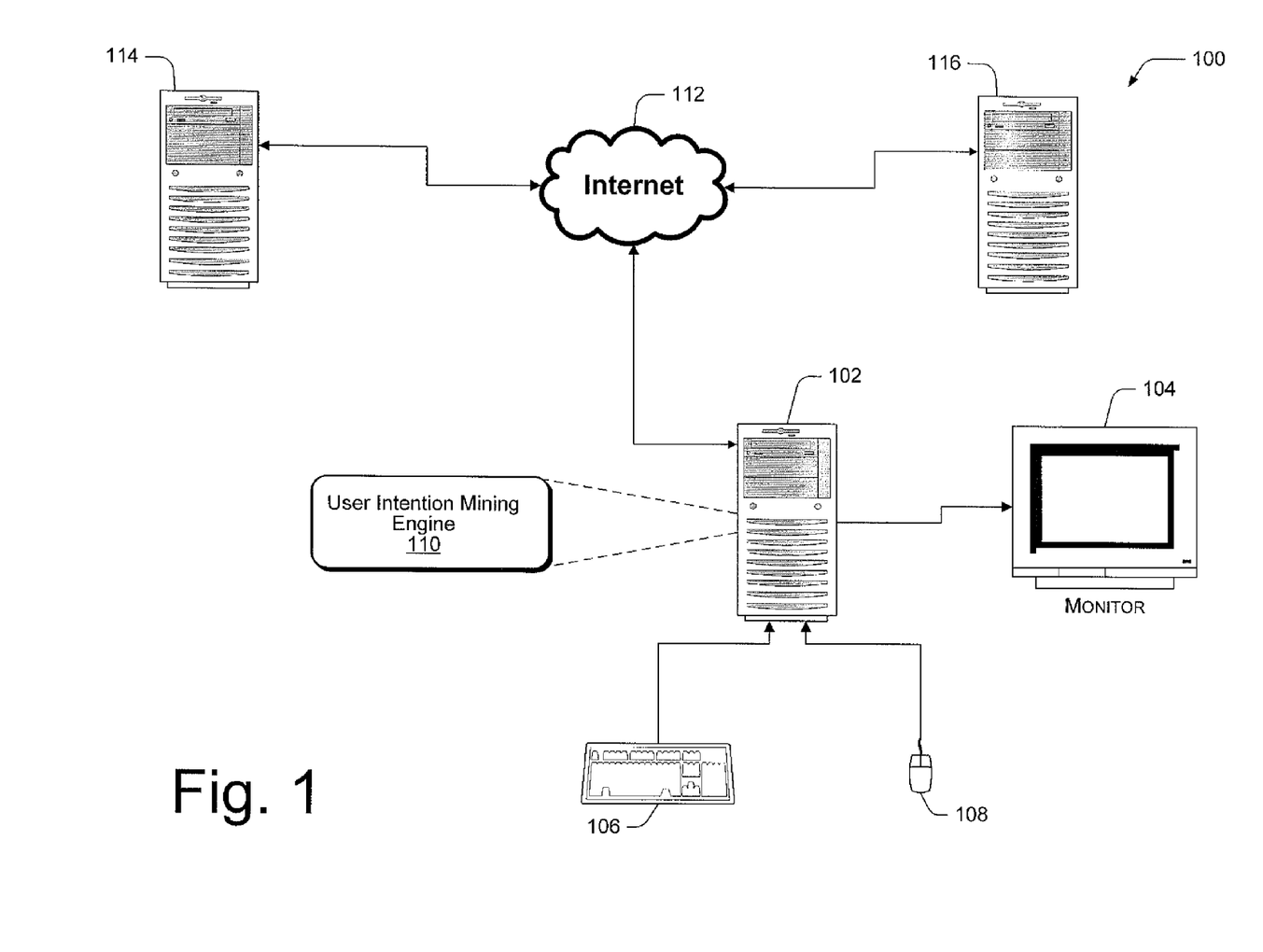
FIG. 1 illustrates an exemplary system for dynamic searching with implicit user intention mining. The exemplary system includes a user intention mining engine.

FIG. 1 illustrates a system 100 for performing dynamic searches with implicit user intention mining, according to one embodiment. In one implementation, system 100 comprises a computer 102, such as a personal computer (PC), having conventional user interface components such as a graphics display or monitor 104, a keyboard 106, and a mouse or other pointing device 108. Computer 102 also includes a user intention mining (UIM) engine 110. As will be discussed in more detail below, UIM engine 110 may be used to dynamically refine a search instigated by a user based on the user's natural responses.

In the example of FIG. 1, computer 102 is a desktop computer. However computer 102 could alternately comprise a variety of other types of computer and computer-like devices, such as a notebook or portable computer, a tablet PC, a cell phone, a personal digital assistant (PDA), a workstation, a mainframe computer, a server, an Internet appliance, a set-top box, combinations thereof, and so on.

Generally, a computer 102 will have various functionalities, allowing a user to perform a number of tasks. For example, computer 102 may be used to run a host of standard computer programs (word processing, spreadsheets, etc.) and games, send and receive emails and instant messages, browse the Internet, etc. A user typically interacts with computer 102 via one or more types of user input interfaces such as by moving an on-screen cursor with the mouse 108, and by typing at the keyboard 106. The user may also input commands or data to the computer 102 through use of a biometric input device, such as a microphone for the entry of voice commands, or any other biometric input device known in the art (not shown for the sake of graphic clarity).

In this implementation, computer 102 is coupled to a network 112, such as the Internet, via any possible connection type known in the art, including telephone lines and ISDN lines. One or more other computers 114 and a server 116 may also be connected to the network 112. In this fashion, computer(s) 114 and server 116 may share data and instructions with each other as well as with computer 102. In another implementation, computer 102 is connected directly to the computer(s) 114, and/or the server 116 without having to go through network 112.

As illustrated in FIG. 1, UIM engine 110 may reside on computer 102. It will be understood, however, that UIM engine 110 may also reside on the computer(s) 114 and/or the server 116. Moreover, different portions of the UIM engine 110 may reside on any of the computer 102, the computer(s) 114 and the server 116 at different times. For example, in one implementation, a user at computer 102 may perform a local desktop search by entering a search term into computer 102 via keyboard 106 in an attempt to find a desired file on computer 102. In this example, the UIM engine 110 resides on the computer 102. In another possible implementation, a user at computer 102 may enter a search term for a Web search into computer 102 via keyboard 106. The search term may be transmitted to the server 116 directly, or via the network 112, and the search may be refined by an instance of UIM engine 110 residing on a different computer such as the server 116. Alternately, in yet another possible implementation, a search term for either a desktop or Web search may be entered into computer 102 and portions of the UIM engine 110 from the computer 102, the computer(s) 114 and the server 116 may be used to refine the search. It will also be understood that desktop searches on computer 102 may be refined by an instance of UIM engine 110 on the computer(s) 114 or on the server 116. Similarly, a Web search may be refined by an instance of UIM engine 110 on computer 102.

A Computing Device

Figure 2:
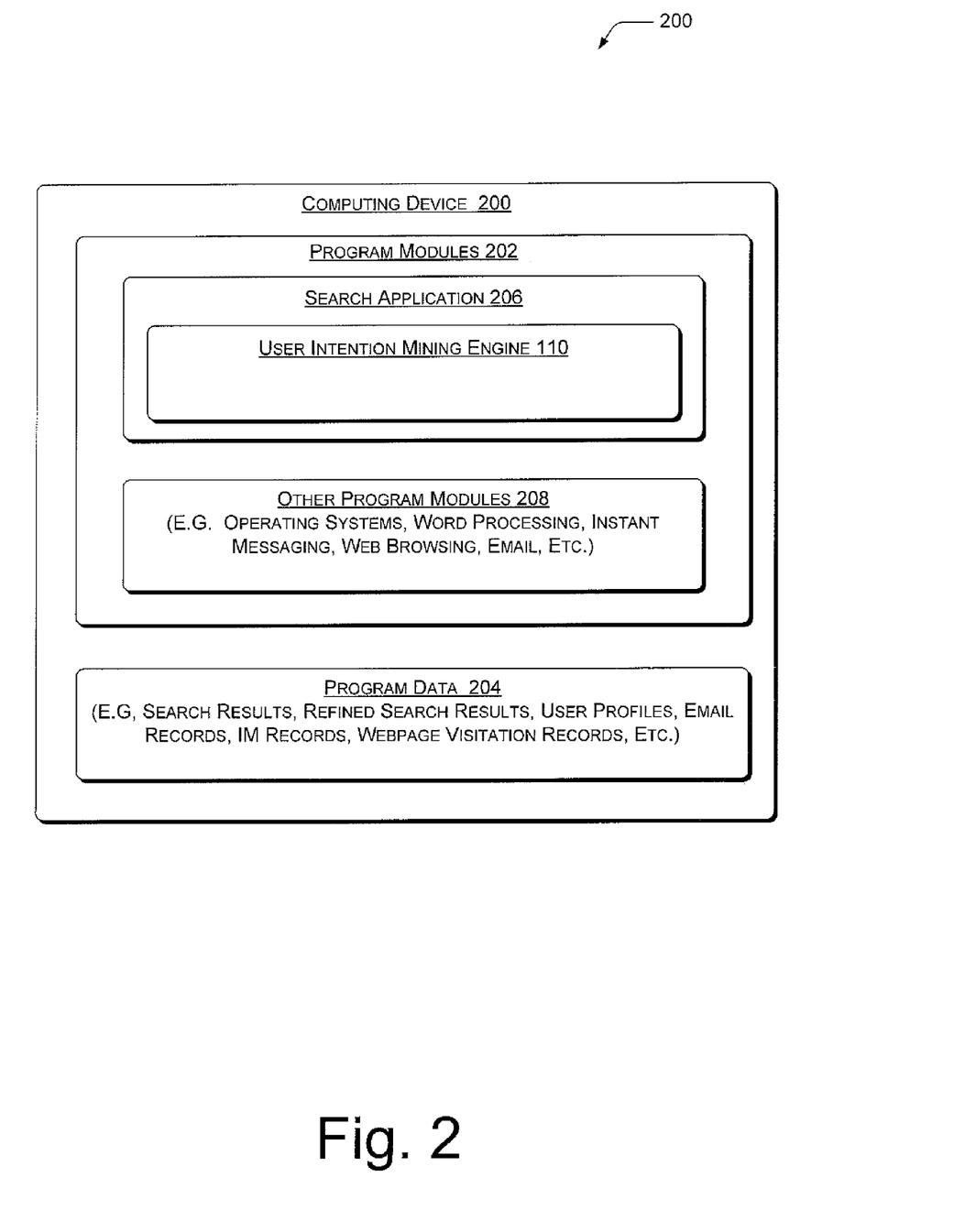
FIG. 2 is a block diagram of a computing device on which an exemplary user intention mining engine resides, according to one implementation.

FIG. 2 illustrates an exemplary computing device 200 including program modules 202 and program data 204. Program modules 202 include a search application 206, which may include the user intention mining (VIM) engine 110. Program modules 202 may also include other program modules 208 such as, for example, an operating system, and one or more applications such as word processing, instant messaging, Web browsing, email, etc. Program data 204, may include various program data such as, original search data, refined search data, user profiles, email records, Instant messaging (IM) records, Website visitation records, etc.

Exemplary Operation of UIM Engine 110

Figure 3:
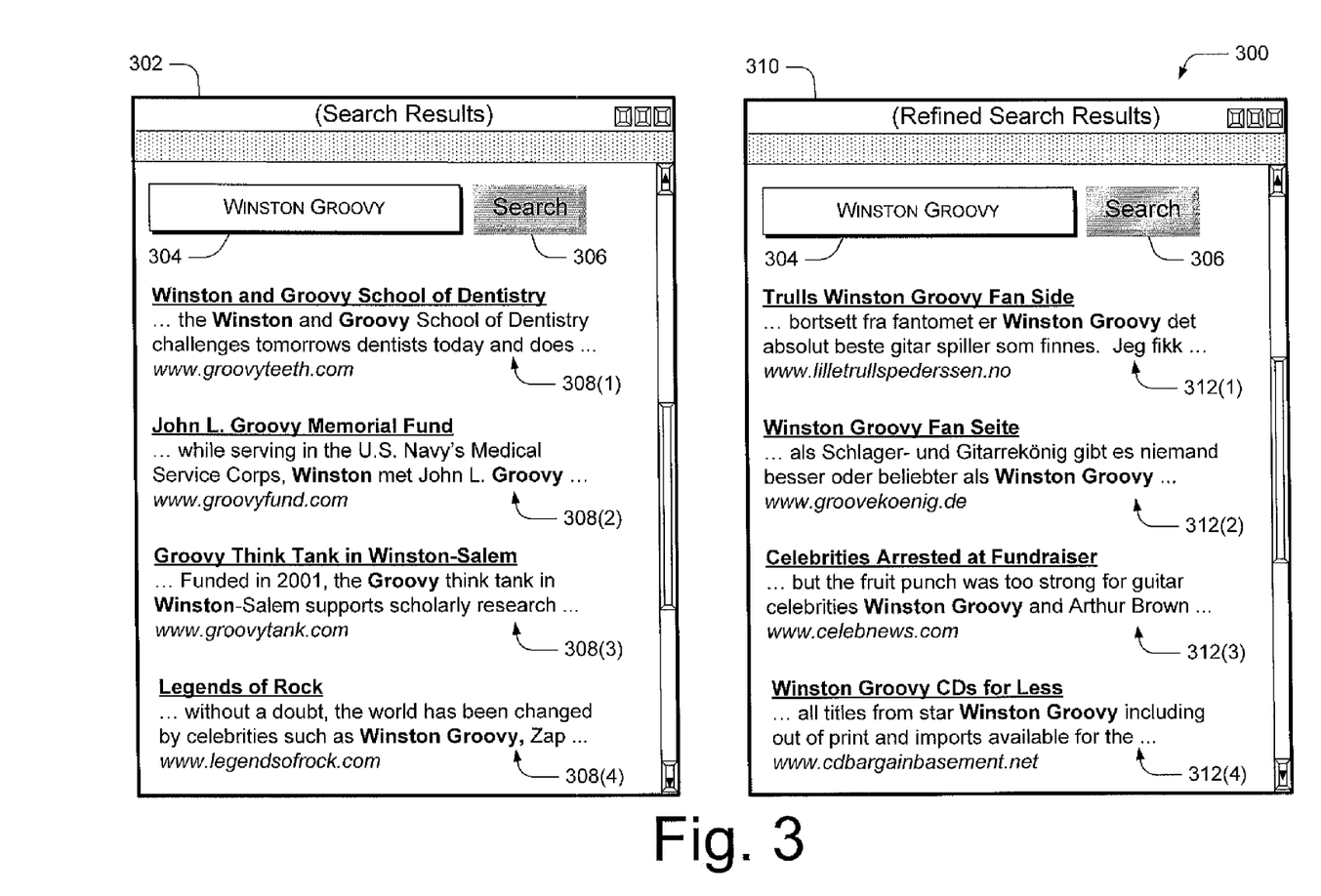
FIG. 3 illustrates a primary window and an exemplary updating window, according to one implementation.

FIG. 3 illustrates exemplary results 300 of a Web search instigated by a user. As shown in primary window 302, the user has instigated a search by inputting a search term into panel 304 and selecting search button 306. The search term has been processed by a search engine, such as search application 206, and search results, including results 308(1)-(4), have been returned. In this example, the search term "Winston Groovy" was input by the user into panel 304 in an attempt to find information regarding a recent public appearance by a music celebrity of the same name. This search term includes the following two words "Winston" and "Groovy". Thus, results 308 (1)-(4) can be expected to include items containing either or both of these search term words. As shown in FIG. 3, results 308(1)-(4) of the user instigated search are varied, with result 308(1) referencing a school of dentistry, result 308(2) referencing a memorial fund, result 308(3) referencing a think tank, and reference 308(4) referencing a rock music site. These varied results are typical, and reflect the notion that a search engine, such as search application 206, may encounter many references containing mention of all, or a portion, of a search term. Given these numerous references which may be found by the search engine, the chance of the user actually finding the information he is searching for in the first iteration of a normal search is remote.

Mining Natural Responses Outside of Present Search

In one implementation, UIM engine 110 can refine the search in the instant example by utilizing natural responses, including information regarding interests, preferences and behavior of the user available outside of the search. For example, UIM engine 110 may monitor applications run by the user, including instant messenger applications, email applications, Web browsing applications, and word processing applications for terms commonly used by the user. In one aspect, UIM engine 110 may monitor instant messages or emails sent and received by the user for recurring terms or themes. Such information may be used to compile a user profile for the user, or to create a model of the general preferences and/or behavior of the user.

Moreover, UIM engine 110 may track websites visited by a user, including websites visited by the user immediately preceding the initiation of a search, by monitoring applications such as Web browser applications used by the user. The importance of the information on a website visited, including data contained on a website such as metadata, can be gauged by factors such as how many times the user visits the website, how long the user stays at the website, how many clicks the user makes at the website (for example, following various links to information contained within the site), how many links the user follows from the website leading to other websites, and how many files the user downloads from the website. The more interaction the user has with the website, the more relevant the data contained on the website, including its metadata, can be deemed by the UIM engine 110 to be to the preferences and/or behavior of the user.

UIM engine 110 may also compile records from previous searches instigated by the user. In this way, original search terms and refining search terms entered by the user may be correlated with websites visited by the user during the evolution of a previous search. Moreover, the original search term and refining search terms may also be correlated with one or more websites visited by the user at a termination of the previous search.

As with the web behavior mentioned above, UIM engine 110 may also determine the relevance of these previously visited web sites to the search terms which referenced them (and to the interests, preferences and behavior of the user in general) by cataloging several factors relating to user interactions with the websites. For example, UIM engine 110 may catalog how many times the user visits a given website, how long the user stays at a given website, how many clicks the user makes at a given website (for example, following various links at the site), how many links the user follows from a given website, and how many files the user downloads from a given website. Generally, the more interaction a user has with a given website, the more relevant UIM engine 110 judges information contained on the website, including metadata, to be to the interests, preferences and behavior of the user, as well as to the search terms entered by the user that brought up the websites.

Additionally, UIM engine 110 may monitor applications in use by the user concurrently with a search being performed by the user. For example, if the user is playing a game, such as Halo marketed by the Microsoft® Corporation, and if the user instigates a search with the term "halo" in it, UIM engine 110 may favor presenting the user with references associated with the video game Halo. Similarly, other applications in use by the user at the time of a search—or having data available to UIM engine 110 at the time of the search—such as word processing applications, email applications, and instant messaging applications, may be mined for terms and data which are be useful in indicating a current interest of the user. In this manner the search can be refined using these natural responses from the user to return results more in line with the interests, preferences and behavior of the user as indicated by the user's natural responses.

Returning to the search example from above, after the user enters the search term "Winston Groovy" and selects the search button 306, the search application 206 employs UIM engine 110 to refine the search. UIM engine 110 may inspect a user file compiled regarding the user's preferences, as discussed above, to see if the user has interacted with any websites having information, including metadata, containing the components of the entered search term. Moreover, UIM engine 110 may inspect the user file to see if other information from applications, such as email applications, IM applications, or word processing applications, contain components of the search term. UIM engine 110 may also examine data sources, such as archived and saved files associated with the user, which may contain components of the search term. If any of these sources are found to contain components of the search term, the portion of the source containing the portion of the search term may be further examined for context useful in refining the search.

For example, if UIM engine 110 finds that the user has frequently browsed websites containing information regarding Winston Groovy and rock music, UIM engine 110 can refine the search to narrow returned results 308 to sites containing references to Winston Groovy and music. Similarly, if the UIM engine 110 finds saved or active emails or instant messages to or from the user in which Winston Groovy is discussed in conjunction with concerts, recordings, or performances, UIM engine 110 may similarly use this information to refine the search to include only sites with references to Winston Groovy in a performance, celebrity, or musical context.

Update window 310 illustrates possible results 312(1)-(4) returned in a search refined by UIM engine 110. It will be understood that in one possible embodiment, once the user enters the search term "Winston Groovy" and selects the search button 306, the search application 206 may employ UIM engine 110 to refine the search and return the results 312(1)-(4) without conducting an unrefined search, such as would return results 308(1)-(4). In such an embodiment only update window 310 would be presented to the user.

Alternately, both unrefined and refined searches may be conducted, and primary window 302 and update window 310 may be presented to the user. It will be understood that if primary window 302 and update window 310 are presented to the user, they may be presented side by side, one over the other, overlapping each other, one inside the other, or in any other configuration known in the art.

As shown in FIG. 3, results 312(1)-(4) in update window 310 are more focused on Winston Groovy the entertainer and celebrity. For example, results 312(1) and 312(2) refer to a Norwegian and a German fan site, respectively, for Winston Groovy the guitarist. Similarly, result 312(3) refers to an article at a news site concerning Winston Groovy the guitar celebrity, while result 312(4) refers an online music store selling CDs by Winston Groovy the star. In effect, UIM engine 110 has taken the search instigated by the user and refined it to return narrow results reflecting the user's interest and preference for Winston Groovy the entertainer as mined from the various applications, files and data sources discussed above.

The refined results 312 in updating window 310 may be updated either periodically based on elapsed time, or elapsed actions by the user. Alternately, the results 312 may be updated in real time whenever relevant information regarding the user's interest, preferences or behaviors is found by UIM engine 110.

For example, once refined results 312 are presented to the user in update window 310, if the user receives an email message containing new information related to Winston Groovy, UIM engine 110 may automatically take this information and refine the search such that the search results 312 reflect this new information. In one exemplary implementation, if the email is received from a friend asking the user if he's heard about a recent public appearance by Winston Groovy in Iceland, UIM engine 110 may refine the search to return results reflecting Winston Groovy the celebrity and entertainer and a recent appearance in Iceland. Alternately, UIM engine 110 may wait a preprogrammed period of time, or a preprogrammed number of user actions, before refining the search to reflect the new information. In still another exemplary implementation, the user may be provided with a button or other device that may be selected by the user when the user wishes for the UIM engine 110 to refine the search.

Even though results 312 are illustrated as links to websites in FIG. 3, the term result, as used herein, will be understood to refer to other objects including queries and common metadata terms, which may be displayed in both the primary window 302 and the update window 310.

Mining Natural Responses from Search

In addition to being able to refine a search by mining a user's natural responses outside of the search, as discussed above, the UIM engine 110 may also refine a search by mining information from a user's natural responses to a search itself For example, returning to the exemplary search discussed in conjunction with FIG. 3 above, once the user has entered the search term "Winston Groovy" and received the results 308, 312 the user has the option of entering more search terms, or of examining the returned results 308, 312 more closely. If the latter is chosen, and the user explores one or more of the results 308, 312, UIM engine 110 may examine the user's natural responses with regard to the results 308, 312 and mine from them valuable information regarding the user's preferences regarding the search. For instance, given that the user is interested in Winston Groovy the guitarist and entertainer, the user may be compelled to click on result 308(4).

UIM engine 110 may track the user's clicks on the result 308(4) and mine information from the user's natural responses to further refine the search. For example, once the user selects result 308(4), UIM engine 110 may examine and catalog how many clicks are made by the user on the website indicated by result 308(4) as well as clicks made on websites reached using links from the website indicated by result 308(4). Moreover, UIM engine 110 may also examine and catalog the length of time the user spends viewing the website indicated by result 308(4), or the length of time the user spends at websites reached by following links from the Website indicated by result 308(4). Similarly, UIM engine 110 may examine the user's behavior to see if anything is downloaded from the website indicated by result 308(4), or if anything is downloaded from websites reached by following links from the website indicated by result 308(4).

With this behavioral data, UIM engine 110 can assign a user preference weight to the various information, including metadata, contained on the websites, and in the downloads. In general, the more a user interacts with a site (i.e. the more time a user spends at the site, the more clicks the user makes at the site, the information the user downloads from the site, etc.) the more relevant the information on the site may be implied to be to the user, and thus the more this information may be reflected in a refined search.

Moreover, UIM engine 110 can also present the user with an additional window including common terms found in the metadata of all the sites visited by the user during the search. Alternately, these terms may be included in the update window 310. The common terms may be selected by the user and used to refine the search. Also, UIM engine 110 may present pictures or other graphics found on websites visited by the user during the search in the same window containing the common metadata terms, in the update window 310, or in a separate window.

UIM engine 110, may also take into consideration the results 308 not selected by the user. By virtue of these results 308 not being selected, UIM engine 110 may infer that the websites referenced by these results 308, as well as the information—including metadata—contained on these websites, is of lesser importance to the user. As a consequence, in future refinements of the search, UIM engine 110 may discount the value of information from such non selected sites, and avoid returning results referencing websites containing metadata and information similar to that contained in the non selected results 308.

Additionally, UIM engine 110 may take into consideration the length of the search term itself. In the above mentioned example, UIM engine 110 can view the brief two word search term of "Winston Groovy" and infer that the user has low confidence in the accuracy of search term and thus desires a broad range of returned search results. Conversely, if the user entered search term included more words, such as "Winston Groovy arrest fundraiser" UIM engine 110 can reasonably infer that the user has a higher level of confidence in the search term and the user is seeking more focused results. On this basis, UIM engine 110 may return more focused results 308 containing all of the words in the search term by correlating these words with information contained within a user profile compiled by UIM engine 110, or with data on user interests, preferences and behavior available to UIM engine 110.

Also, as with the mining of a user's natural responses outside of a present search as discussed above, the refined results 312 presented in update window 310 may be updated in real time, or periodically based on a preset elapsed time or a preset elapsed number of user actions. For instance, if desired in real time, the results 312 in update window 310 may be further refined every time the user clicks on a result 308, or takes an action relevant to information contained in a result 308. Alternately, UIM engine 110 may save the user's natural responses and use them every 30 seconds, or other preset time period, to refine the search.

In yet another exemplary implementation, UIM engine 110 may wait a predetermined number of natural responses before refining the search. In still another exemplary implementation, the user may be provided with a button or other device selectable by the user when the user wishes for the UIM engine 110 to refine the search.

Wining all Natural Responses

UIM engine 110 may also combine the approaches discussed above and mine information from the user's natural responses made before and during a search. Using the example above, once the user enters "Winston Groovy", UIM engine 110 may consult existing information regarding the user, such as a user profile, a model of the general preferences and/or behavior of the users or other existing sources of data regarding the preferences and behavior of the user, as discussed above. With this information, UIM engine 110 can narrow the search and return refined results 312(1)-(4) as shown in updating window 310.

UIM engine 110 may then examine the user's interactions with either the search results 308 returned in primary window 302, or the refined results 312 returned in updating window 310, and mine the user's natural responses, as discussed above, to determine interests and preferences of the user. This information, along with the existing information regarding the user's interests, preferences and behaviors, can then be used to produce further refined results.

Switching Primary and Updating Windows

Figure 4:
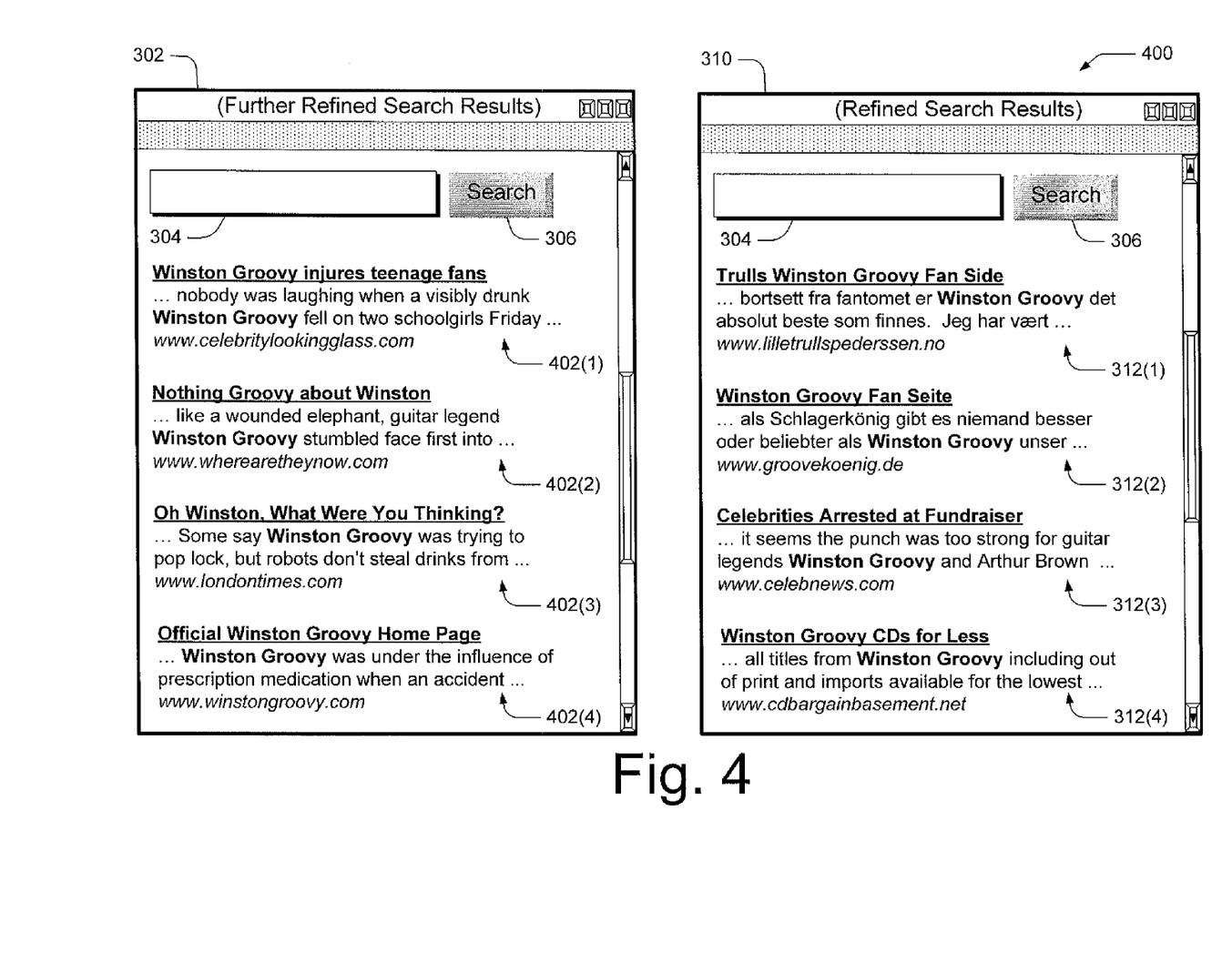
FIG. 4 illustrates another exemplary implementation of a primary window and an exemplary updating window.

In all of the search refinement implementations discussed above, it is also be possible to switch between primary and updating search windows. One possible implementation of this is illustrated in FIG. 4, which depicts exemplary refined results 400 of a Web search instigated by a user. In FIG. 4 the update window 310 of FIG. 3 is shown alongside primary window 302 including further refined results 402. These further refined results 402 may be created by UIM engine 310 in response to natural responses from the user as the user selects and interacts with results 312.

When such further refined results 402 are presented, the window in which the further refined results 402 appear can be termed the update window, while the window in which the results 312 being interacted with by the user are found can be termed the primary window.

It will also be understood that if the user begins interacting with the further refined results 402 in window 302, refined results based on these interactions may be presented in window 310. In this manner, the primary and updating windows can flip flop back and forth.

It will also be understood that more than two windows may be used to display search results and more refined search results. Alternately, results and refined results may be displayed in the same window. Further, it will be understood that even though Web searches are discussed above, UIM engine 110 may also be used in conjunction with other searches, including desktop searches, and that the mining may be done on computer 102, computer(s) 114 or server 116. Additionally, the UIM engine 110 may perform mining from computer 102, computer(s) 114, or server 116, and UIM engine 110 may have portions thereof located on any combination of computer 102, computer(s) 114, and server 116. In one exemplary embodiment, the server 116 or computer(s) 114 assists in refining searches by contributing popular results of searches conducted by others. In the example above, if many users of server 116 have been searching for news regarding a recent public appearance by Winston Groovy, when "Winston Groovy" is entered by a user on computer 102, server 116 may be used to return the result(s) that users of server 116 settled on after entering the same or similar search terms.

Moreover, server 116 may accept the search term "Winston Groovy" from computer 102 and return categories including some often used queries that have been entered for "Winston Groovy" by other users of server 116 and computer(s) 114.

Additionally, it will also be understood that UIM engine 110 may monitor search terms added by the user to the original search term, or search terms entered by the user replacing the original search term. For example, simple refinements to an existing search term may be implied to infer that the user is mostly satisfied with the search results received, but wishes to fine tune the search to narrow it. Thus, UIM engine 110 may react conservatively, and narrow the results from the existing search slightly given the new search terms.

Alternately, if the user replaces a search term with new search term, or a search term substantially different than those used previously, UIM engine 110 may infer that the user is dissatisfied with previous searches and is looking to broaden the search or receive new types of results. As a consequence, UIM engine 110 may endeavor to provide the user with a greater variety and/or a broader variety of results corresponding to the new search results.

It will also be understood, that in general, all of the data mined by UIM engine 110 may be subjected to various learning algorithms known in the art in order to determine the user's intentions in instigating the search. Use of learning algorithms in this manner may help UIM engine 110 to more quickly provide the user with results corresponding to information or data sought by the user.

An Exemplary Procedure to Dynamically Refine a Search

Figure 5:
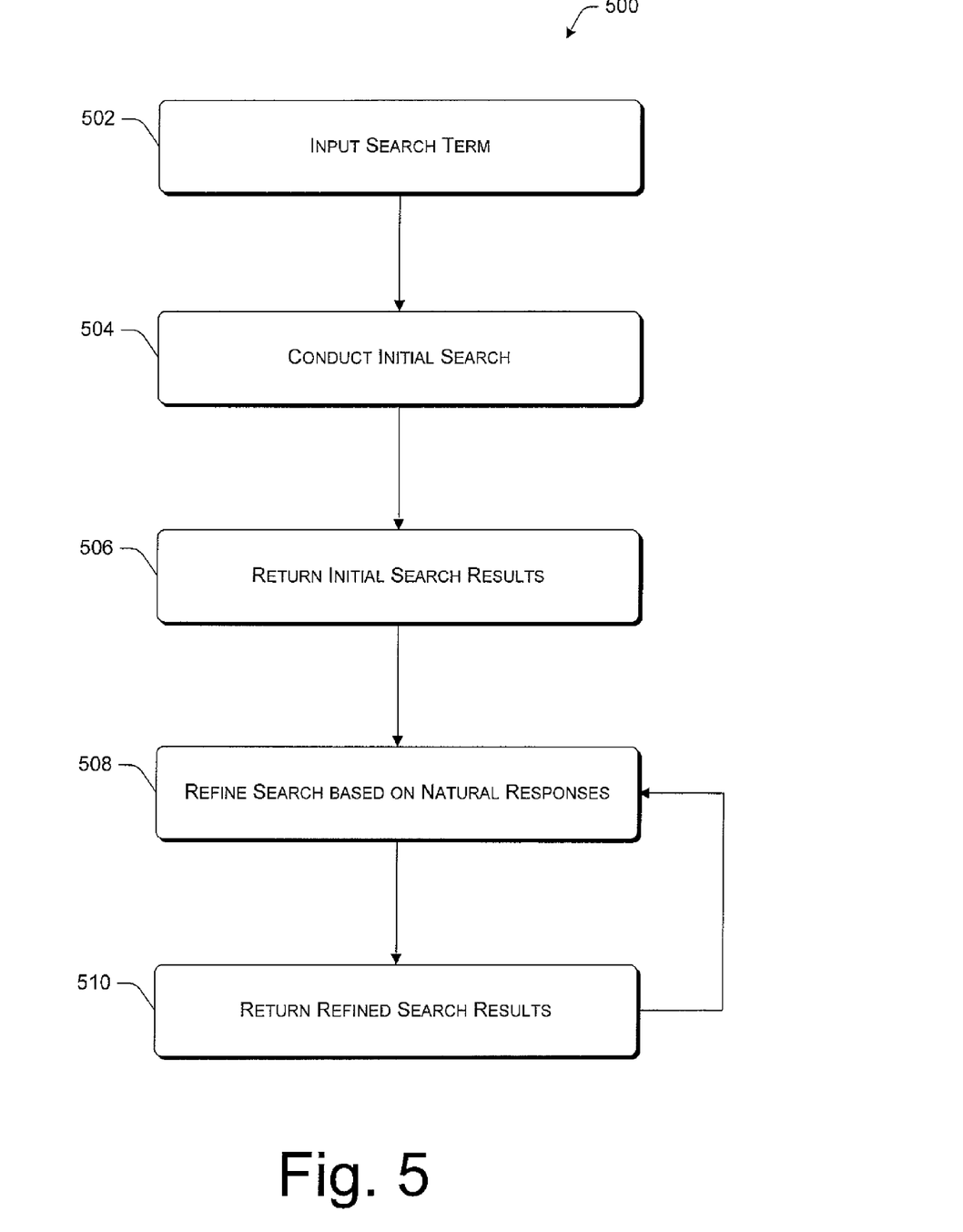
FIG. 5 is a flow diagram of an exemplary method of dynamically refining a search.

FIG. 5 shows an exemplary procedure 500 to refine a search instigated by a user based on natural responses from the user. For ease of understanding, the method 500 is delineated as separate steps represented as independent blocks in FIG. 5; however, these separately delineated steps should not be construed as necessarily order dependent in their performance. Additionally, for discussion purposes, the method 500 is described with reference to elements in FIGS. 1-4. This flow diagram may be implemented in any suitable hardware, software, firmware, or combination thereof. In the case of software and firmware, this diagram represents sets of operations implemented as computer-executable instructions. The left-most digit of a component reference number identifies the particular figure in which the component first appears.

At block 502, a search term may be input by a user to instigate a search. For example, one or more words related to a topic of interest to the user may be entered into a search engine, such as search application 206. In one implementation, an initial search may be conducted based on the search term (block 504) and the results of the initial search may be presented to the user (block 506). Natural responses made by the user while interacting with the results of the search may then be mined for information indicating the user's interest or disinterest in the results. In one possible implementation, this mining is done by UIM engine 110. For example, the user's clicks on each refined result, as well as the time spent by the user at individual websites, may be tracked. Similarly, the amount of material downloaded from a site may be tracked.

In general, the more interaction with a site exhibited by a user, the more the information on the site, including metadata, can be considered significant in regard to the user's interests, preferences and behavior. In addition, the length of the search term itself may be examined, with short search terms implying that the user is looking for a broader ranger of results and longer search terms implying that the user is looking of a narrower range of results.

Natural responses may also be mined from other sources outside the search, including existing data, such as user profiles, models of the general preferences and/or behavior of a user, or other existing sources of data regarding the preferences and behavior of a user. Additionally, natural responses may be mined from applications previously used by the user, and/or in use by the user at the time of the search. This may include examining emails, instant messages and word processing files attributable to the user.

The results of natural response mining may then be used to refine the search (block 508). Such refining may be carried out by the UIM engine 110, or by a separate program or application on computer 102, computer(s) 114 or server 116. Refining the search may include subjecting the mined information to learning algorithms in order to determine the user's intentions for instigating the search.

Once the search is refined, new refined results may be presented to the user that more closely match the interests, preferences and/or behaviors of the user (block 510). The user may interact with these refined results (returning to block 508). Natural responses from these interactions may then be mined to refine the search even further, such that new refined search results may be presented to the user (block 510). This interaction/refinement loop (blocks 508-510) may continue until the user tires of the search, or the result being sought is finally located.

It will also be understood that several of the blocks in method 500 may be skipped. For example, once the user inputs a search term (block 502), natural responses from existing data outside of the search, such as the user profiles, models of the general preferences and/or behavior of a user, and other existing sources of data regarding the preferences and behavior of a user discussed above, may be used to produce a refined search (block 510) placing the user directly in the loop created by blocks 508 and 510.

An Exemplary Procedure to Refine a Search Based on User Interactions

Figure 6:
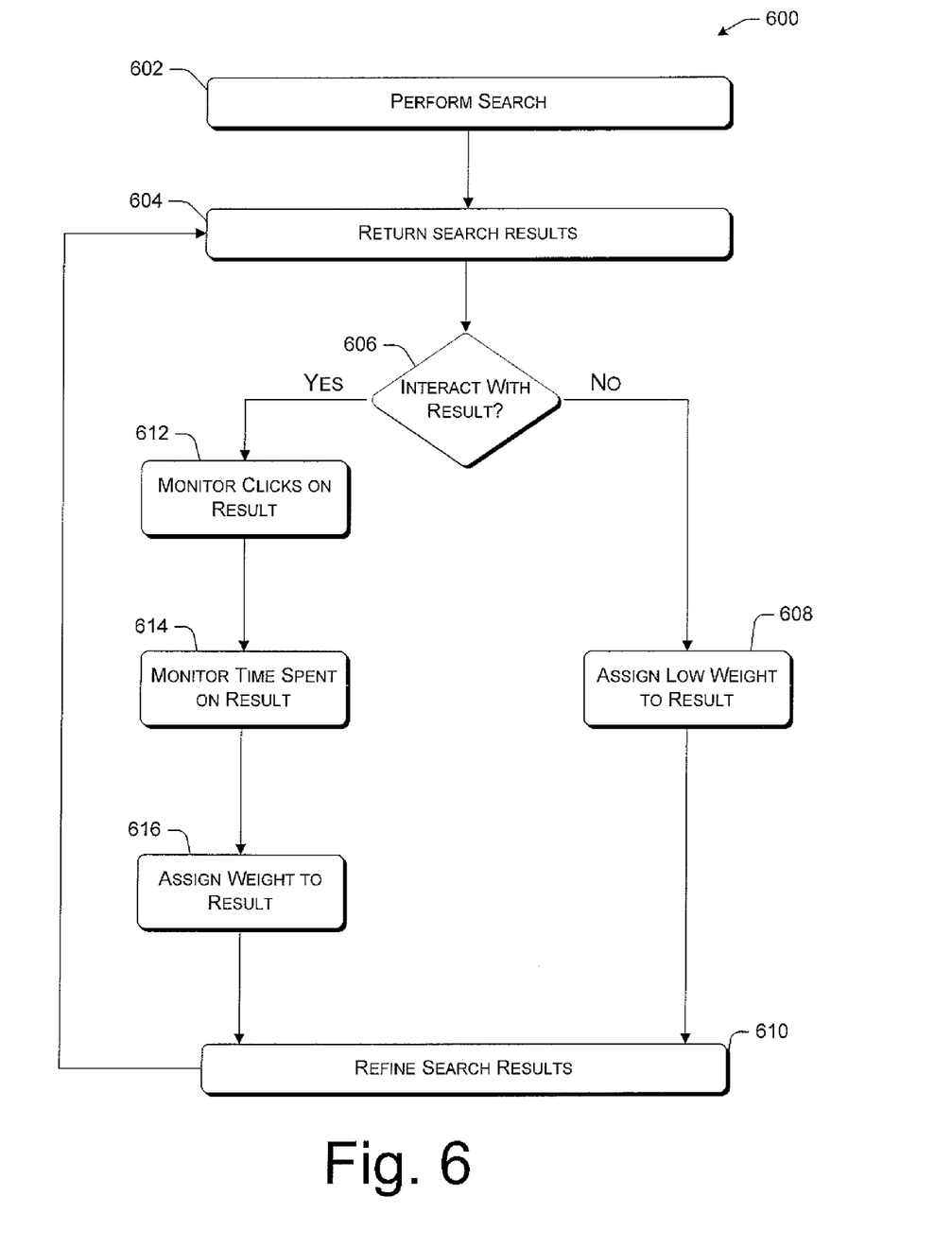
FIG. 6 is a flow diagram of an exemplary method of dynamically refining a search based on user interactions with returned search results

FIG. 6 shows an exemplary procedure 600 to refine a search based on user interactions with returned search results. Method 600 is described with reference to elements in FIGS. 1-4. The left-most digit of a component reference number identifies the particular figure in which the component first appears. The method 600 is delineated as separate steps represented as independent blocks in FIG. 6. These separately delineated steps should not be construed as necessarily order dependent in their performance. The operations of procedure 600 may be implemented in any suitable hardware, software, firmware, or combination thereof.

After a user has entered an initial search term, an initial search is conducted (block 602). Searches may be conducted using a search engine, such as search application 206. Once the initial search is completed, search results are returned (block 604).

The user's interactions with returned search results may then be examined for user intentions. In one embodiment, this examination is conducted using the UIM engine 110. For example, the user may be afforded the option to interact with each search result (block 606). If the user declines to interact with a given result ("no" path from block 606) this implies that the result does not correlate well with the desired end result of the user's search, and thus the rejected result, as well as the information contained in the rejected result—including metadata—may be assigned a low weight (block 608). The method 600 may then refine the search results presented in block 604 and exclude results similar to the result rejected at block 606 (block 610).

Alternately, if the user decides to interact with a search result ("yes" path from block 606), the method 600 monitors the number of clicks the user makes at a site indicated in the result (block 612). The more clicks the user makes on the site, the more interested the user can be inferred to be in the site and in information—including metadata—contained at the site. Method 600 may also track the user's clicks on links encountered on the chosen result. In a similar manner, the more clicks the user makes on these linked sites, the more interested the user may be inferred to be in these sites and in the information contained at these sites.

Method 600 may also monitor the amount of time the user spends at a site indicated by the chosen result (block 614). More time at a site may be inferred to indicate more user interest in the information—including metadata—contained at the site. Similarly, method 600 may monitor the user's time spent looking at sites arrived at by following links from the chosen site in order to infer a user's interest level in information contained at these sites.

Once method 600 has collected this user interest information, a weight reflecting the relevance of the sites to the user's search is assigned to the various sites visited by the user, and the information contained at these sites (block 616).

The weighted user interest information is then be used to produce refined search results (block 610) having a higher correlation to the user's interests as measured at blocks 612-614. It will be understood that one or more learning algorithms may be employed at block 610 in conjunction with information compiled from blocks 612-616, as well as from block 608, to attempt to uncover the true intentions of the user in instigating the search.

Once the refined search is conducted, the refined search results produced are then be returned at block 604, where the user is be given the option of interacting further with these results to continue refining the search.

An Exemplary Operating Environment

Figure 7:
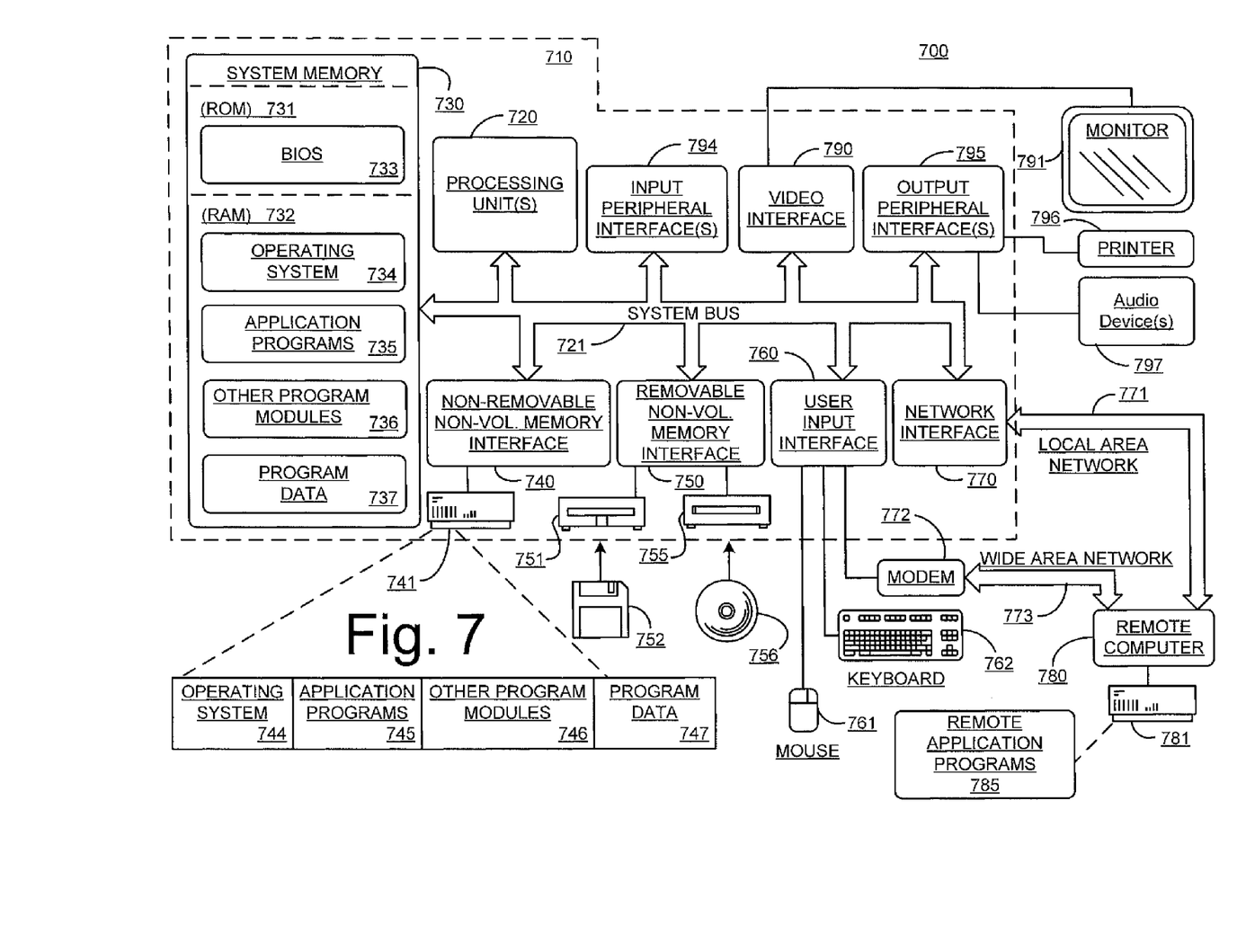
FIG. 7 illustrates an example of a suitable computing environment in which a search may be dynamically refined.

FIG. 7 illustrates an example of a suitable computing environment in which a dynamic search with implicit user intention mining is conducted. Exemplary computing environment 700 is only one example of a suitable computing environment for the exemplary components and operations described above with respect to FIGS. 1-6. FIG. 7 is not intended to suggest any limitation as to the scope of use or functionality of systems and methods the described herein. Neither should computing environment 700 be interpreted as having any dependency or requirement relating to any one or combination of components illustrated in computing environment 700.

The methods and systems described herein are operational with numerous other general purpose or special purpose computing systems, environments or configurations. Examples of well-known computing systems, environments, and/or configurations that may be suitable for use include, but are not limited to, personal computers, server computers, multiprocessor systems, microprocessor-based systems, network PCs, minicomputers mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 7, an exemplary system for calculating an intensity similarity measure based on the PQ noise model includes a general purpose computing device in the form of a computer 710 implementing, for example, computing device 200 of FIG. 2. The following described aspects of computer 710 are exemplary implementations of computing device 200, computer 102, computer(s) 114 and server 116. Components of computer 710 may include, but are not limited to, processing unit(s) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 710 typically includes a variety of computer-readable media. Computer-readable media can be any available media that can be accessed by computer 710 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Application programs 735 includes, for example program modules of computing devices 102 or 104 of FIG. 1. Program data 737 includes, for example, program data of computing devices 102 or 104 of FIG. 1. Operating system 744, application programs 745, other program modules 746, and program data 747 are given different numbers here to illustrate that they are at least different copies.

A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB).

A monitor 791 or other type of display device is also connected to the system bus 721 via an interface, such as a video interface 790. In addition to the monitor, computers may also include other peripheral output devices such as printer 796 and audio device(s) 797, which may be connected through an output peripheral interface 795.

The computer 710 operates in a networked environment using logical connections to one or more remote computers, such as a remote computer 780. In one implementation, remote computer 780 represents computing device 102 or networked computer 104 of FIG. 1. The remote computer 780 may be a personal computer, a server, a router, a network PC, a peer device or other common network node, and as a function of its particular implementation, may include many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example and not limitation, FIG. 7 illustrates remote application programs 785 as residing on memory device 781. The network connections shown are exemplary and other means of establishing a communications link between the computers may be used.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed invention. For example, although FIG. 2 shows that engine 110 resides within search application 206, UIM engine 110 may also reside outside of search application 206. For example, UIM engine 110 may be included within an operating system. Alternately, UIM engine 110 may exist as a separate application. Accordingly, the specific features and acts are disclosed as exemplary forms of implementing the claimed invention.

The invention claimed is:

1. A computer comprising:
   a processor;
   a memory coupled to the processor, wherein the memory includes computer-program instructions executable by the processor, the computer-program instructions for dynamic search with implicit user intention mining comprising a user intention mining engine to perform operations on the computer comprising collecting information, the information collected comprising:
   information from emails and instant messages sent or received by the user at the computer;
   information from other applications running on the computer concurrent with the search;
   information from interests, preferences and behavior of the user available outside of the search;
   information from natural user responses to search results returned in a first window by a search instigated by a user and utilize the information to refine the search, wherein the information from natural user responses comprises:
   other applications with which the user interacts during the search;
   a number of clicks by the user on a particular returned result;
   a length of time a user spends reviewing the particular returned result;
   assigning a weight to the particular returned result;
   wherein the user intention mining engine:
   configures a second window of a user interface on the computer to dynamically update the results of a refined search responsive to dynamically collected information of the user;
   allows the user to interact with results in the second window;
   mines further interest and behavior information concerning the user from user interactions with the search results in the second window; and
   presents in the first window results from a further refined search based on the further interest and behavior information;
   wherein mining further comprises:
   tracking the number of links followed by the user from a particular search result; and gathering information from other applications running on the user computing system concurrent with the search.

2. The computer of claim 1, wherein the information from natural user responses comprises metadata or other information from websites visited by the user.

3. The computer of claim 1, wherein the information from natural user responses comprises at least one of a number of user clicks a user makes on a particular result returned by the search, which results returned by the search are selected by the user, and how many links the user follows from a given website.

4. The computer of claim 1, wherein the user intention mining engine further collects information from natural user responses comprising a length of a search term input by the user.

5. The computer of claim 1, wherein the user intention mining engine further collects information from natural user responses comprising initial and successive search terms input by the user.

6. The computer of claim 1, wherein the user intention mining engine further collects information from natural responses including one of information from files accessed by the user, and information input to the computer by the user.

7. The computer of claim 1, wherein the computer comprises a first computer, and the operations are performed jointly on the first computer and a second computer.

8. One or more computer-readable media comprising computer-program instructions stored thereon, which are executable by a processor on a user computing system, the computer-program instructions including instructions for performing operations comprising:
   obtaining a search term from a user;
   performing a search based on the search term;
   presenting search results based on the search term in a primary window;
   mining natural responses of the user to the search results, wherein mining natural responses comprises:
      monitoring a number of clicks by the user on a particular returned result;
      tracking the number of links followed by the user from the particular returned result;
      monitoring a length of time a user spends reviewing the particular returned result,
   wherein monitoring the length of time comprises monitoring an amount of time elapsing between a click on a search result and a click on another search result;
      assigning a weight to the particular returned result based at least on the mining;
      intention mining information from:
         interests, preferences and behavior of the user identified outside of the search;
         other applications running on the user computing system concurrent with the search;
         other applications with which the user interacts during the search;
         emails and instant messages sent or received by the user at the computing system;
   refining the search based at least in part on mining the natural responses and the intention mining;
   returning refined search results in a secondary window;
   displaying the results of the refined search to the user in the secondary window;
   dynamically updating the results of the refined search responsive to intention and natural response information of the user;
   allowing the user to interact with the results of the refined search;
   mining further intention and natural response information concerning the user from user interactions with the search results in the second window; and
   presenting in the primary window results from a further refined search based on the further intention and natural response information.

9. The one or more computer-readable media of claim 8, further comprising collecting information regarding user preferences from both a server and a client device on which the user has been active.

10. The one or more computer-readable media of claim 8, wherein refining comprises refining the search after each natural response is made by the user.

11. The one or more computer-readable media of claim 8, wherein refining comprises one of refining the search after a preset number of natural responses are made by the user, and refining the search after a preset period of time has elapsed.

12. The one or more computer-readable media of claim 8, wherein returning comprises presenting the refined search results in an updating window.

13. A computer-based method, comprising:
   displaying results of a search instigated by a user through input of one or more search terms in a first window;
   enabling the user to interact with the search results;
   mining interest and behavior information associated with the user from emails and instant messages sent or received by the user at the computer and from interactions of the user with the search results, wherein the mining comprises:
      monitoring a number of clicks by the user on a particular returned result;
      monitoring an amount of time elapsing between a click on a search result, and a click on another search result;
      assigning a weight to the particular returned result based at least in part on the mining;
   refining the search based on the mined interest and behavior information;
   returning results of the refined search based on the mined interest and behavior information in a second window; and
   dynamically updating the results of the refined search responsive to interest and behavior information of the user;
   allowing the user to interact with results in the second window;
   mining further interest and behavior information concerning the user from user interactions with the search results in the second window; and
   presenting in the first window results from a further refined search based on the further interest and behavior information;
   wherein mining further comprises
      tracking the number of links followed by the user from a particular search result; and
      gathering information from other applications running on the user computing system concurrent with the search.

14. The method of claim 13, further comprising reviewing a user's files and a user's actions outside of the search to develop user interest and behavior information.

15. The method of claim 13, wherein mining further comprises gathering information from other applications with which the user interacts during the search.

* * * * *